P. T. SHARPLES.
PROCESS OF AND APPARATUS FOR SEPARATING SOLIDS FROM LIQUIDS.
APPLICATION FILED MAY 6, 1916.
1,232,104.
Patented July 3, 1917.
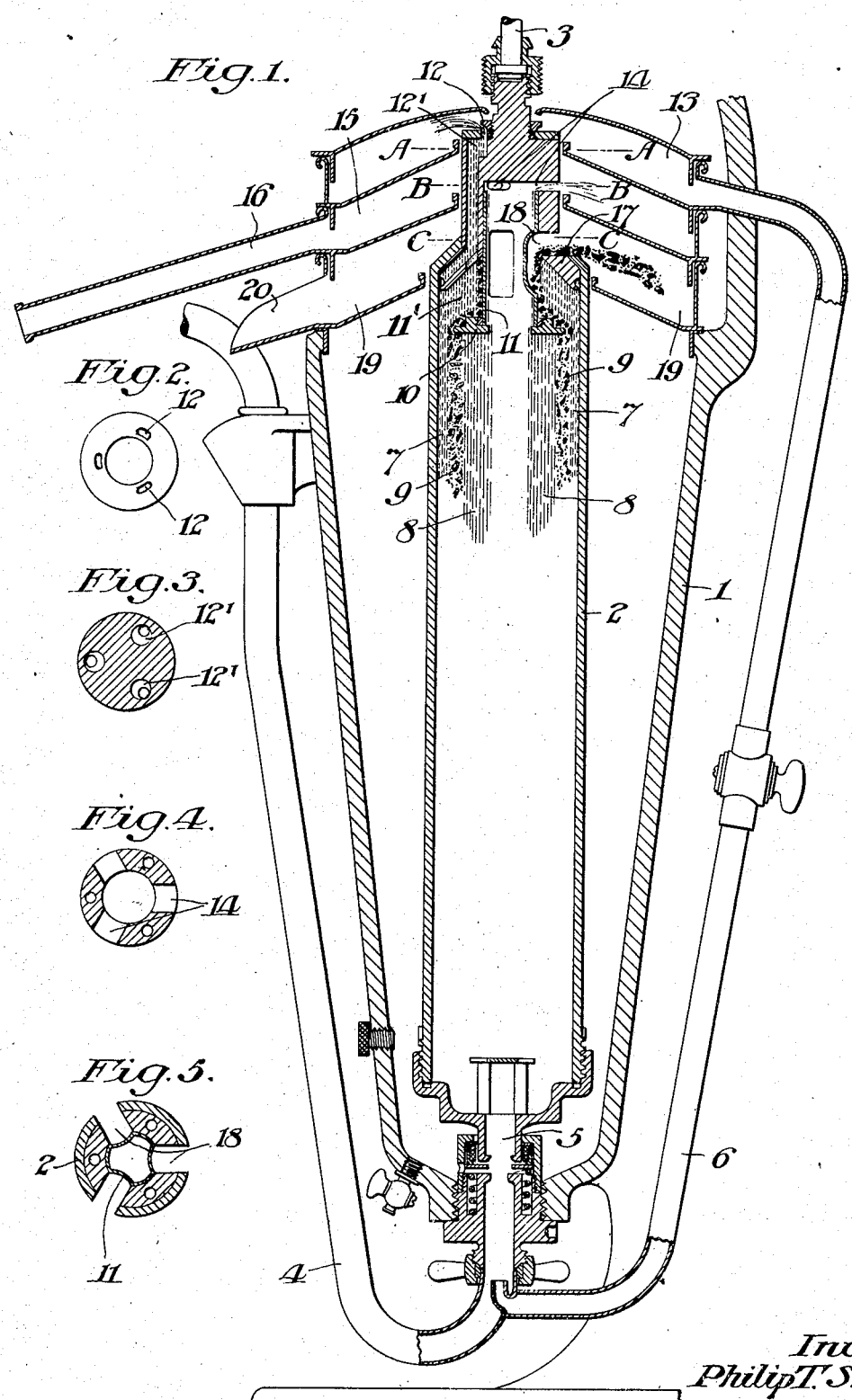

UNITED STATES PATENT OFFICE.

PHILIP T. SHARPLES, OF WEST CHESTER, PENNSYLVANIA.

PROCESS OF AND APPARATUS FOR SEPARATING SOLIDS FROM LIQUIDS.

1,232,104. Specification of Letters Patent. Patented July 3, 1917.

Application filed May 6, 1916. Serial No. 95,745.

*To all whom it may concern:*

Be it known that I, PHILIP T. SHARPLES, a citizen of the United States, residing at West Chester, in the county of Chester and State of Pennsylvania, have invented an Improved Process of and Apparatus for Separating Solids from Liquids, of which the following is a specification.

This invention relates primarily to the separation of solids from liquids by the use of centrifugal force, and it involves the idea of carrying or floating the separated solids by means of a liquid, by which carrying liquid such solids are distributed, floated off, or otherwise treated by means of the centrifugal force effecting the separation.

In the centrifugal separation of certain solids combined with or suspended in liquids, as heretofore practised, the liquid flows through the revolving bowl or rotor of the separator, while the solids accumulate within the bowl, which must be stopped to remove them, with resulting inconvenience and loss, particularly where the percentage of solids is high. As the speed and centrifugal force developed are very high in the centrifugal separation of certain solids, so that the pressure of solid particles against the bowl is commonly 20000 to 40000 times their weight, such particles have heretofore accumulated within the wall of the bowl, with which they travel, until the separator becomes clogged, is stopped and the contents removed, it having been found impracticable to operate continuously and effect the discharge of the solids by mechanical devices. This accumulation of solids and stoppage for their removal render the operations in which they are involved impracticable, generally, if the volume of the solids is more than one per cent. of the total volume. But in a large percentage of the cases where it is desired to effect the separation, the volume of the solids to be removed is considerably more than 1% of the whole.

The desirability of utilizing centrifugal force for the separation of solids which have heretofore been separated by filtration will be appreciated by considering the many disadvantages of filtration, with reference to time, materials, expense, failure to separate fine particles, and clogging of the filtering material by the accumulation of solid matter, which render filtration impossible in many cases.

Centrifugal force will frequently effect separations that are impossible or impracticable by gravity and under nearly all circumstances the centrifugal separation is more thorough, rapid, and convenient, reducing the volume of material on hand at any time and saving considerable space.

In my invention, centrifugal force is utilized to separate from the liquids in which they are suspended or contained, solids of different specific gravity, regardless of the size of the particles or any usual percentage thereof, and the separation is effected very completely, conveniently, rapidly and inexpensively.

Generally, my invention is practised by providing the revolving bowl of a suitable centrifugal machine with a liquid carrier heavier than and adapted for supporting or conveying the solid to be separated, passing into the bowl the liquid containing the solid to be separated, effecting the separation within the bowl by the centrifugal force developed by its revolution at proper speed and floating the solids so as to distribute them within the rotor or carry them off by means of the carrier liquid. Where the operation is designed to float off separated solids, they are ordinarily concentrated between the concentric spaces occupied by the two liquids, as such solids pass through the bowl toward their outlet, the carrier liquid usually, though not necessarily circulating through the bowl continuously by connecting its outlet with the bowl inlet.

This operation can be carried on uninterruptedly, without any interference with the complete, regular and continuous separation of the solids and floating them off either by means of liquids heavier than the solids or because the solids are floated on the conveying liquid for any reason, as by means of particles of the lighter liquid clinging to the solids and supporting or buoying them on the conveying liquid.

It will be understood that there are many applications of the process and that it may be practised by the use of various mechanisms within the scope of this invention.

In the drawings, Figure 1 is a vertical sectional view of a centrifugal separator;

Fig. 2 is a detached plan view of the disk through which the heavy liquid is discharged; Fig. 3 is a sectional view taken on the line A—A of Fig. 1; Fig. 4 is a sectional view taken on the line B—B of Fig. 1; and Fig. 5 is a sectional view taken on the line C—C of Fig. 1.

The drawings illustrate a centrifugal separator whose frame 1 contains a revoluble tubular bowl 2 which is suspended by the journaled spindle 3.

Liquid containing solid matter to be separated therefrom is introduced to the bowl by a conduit 4 through the bowl inlet 5 in the bottom thereof, and the carrier liquid is introduced to the bowl through the same inlet by a conduit 6 which discharges into the conduit 4, the liquid and solid matter thus introduced within the bottom of the revolving bowl being separated therein, as they are moved to the top of the bowl, by the centrifugal force.

The separation has been completely effected when the liquids and solids have reached the top of the bowl, where the carrier liquid forms an outer curved wall 7 within the bowl, the lighter liquid forms an inner curved wall 8 and the separated solids occupy a space 9 between the lighter liquid from which they have been separated and the outer carrier liquid.

The carrier liquid is passed by the centrifugal force, exterior to the disk 10, suspended by a sleeve or diaphragm 11 fixed concentrically in the top of the bowl, into the compartment or chamber 11′ in the top of the bowl, and is discharged through the passages 12′ and outlets 12 in the top of the bowl into the receptacle 13, which delivers the liquid back to the tube 6 for further circulation. The lighter liquid passes within the disk 10 and sleeve 11, whence it is delivered through the outlets 14 into the receptacle 15 which discharges through a spout 16. The solid matter passes exterior to the disk 10 into the chamber or receptacle 11′ and thence over a lip 17 through outlets 18 which deliver into the receptacle 19 having a discharge spout 20.

It will be understood that the desired adjustments for the specific gravities of the materials dealt with can be made by properly proportioning the distances from the axis of revolution of the bowl to the inner lip of the disk 10, the outer lip of the outlets 12, and the inner lip of the outlets 18.

While my invention is applicable to the large number of cases where it is desirable to separate solids from liquids and float off such solids by means of a second liquid, it is not limited to this use, as it is applicable generally to any case where a liquid's constituents of different specific gravities are separated by centrifugal force and one or more of the heavier constituents can be floated or floated off by means of a carrier liquid, which may be desirable by reason of the semi-solid, viscous or other characteristic of the separated constituent or constituents.

A special use is in connection with carriers lighter than a constituent to be separated as, for instance, tar mixed with sawdust, which can be separated centrifugally and the sawdust floated by water as a carrier, which is lighter than the tar, heavier than the sawdust, and maintains their separation so that they can be floated off independently, each free from the other.

Having described my invention, I claim:

1. The process of separating a composition having constituents of different specific gravities which consists in subjecting the composition and a carrier liquid heavier than said constituents to centrifugal force so as to separate them and then delivering the lighter of the constituents to a receptacle and the heavier constituent and the carrier liquid together into a different receptacle.

2. The process of separating a composition comprising a liquid constituent and a heavier solid constituent which consists in introducing said composition and a liquid carrier together into a centrifugal vessel, centrifugally separating said constituents by revolving said vessel and delivering the liquid constituent to a receptacle and the solid constituent and the carrier liquid together to a different receptacle.

3. The process of separating a composition having constituents of different specific gravities which consists in subjecting the composition and a carrier liquid to centrifugal force so as to separate them, then delivering the lighter of said constituents to a receptacle and the heavier of said constituents together with said carrier liquid to a different receptacle, and then delivering said heavier constituent and said carrier liquid to different receptacles.

4. The process of separating a composition having constituents of different specific gravities which consists in introducing said composition and a carrier heavier than said constituents together into a centrifugal vessel, centrifugally separating said constituents and said carrier by revolving said vessel, delivering the lighter of said separated constituents to a receptacle and the heavier of said constituents together with said carrier to a different receptacle, delivering said heavier constituent and said carrier from said last named receptacle to separate receptacles, and returning said carrier to said vessel.

5. A centrifugal machine having a revoluble bowl provided with an inlet, a diaphragm forming a receptacle within said bowl, separate outlets from said receptacle for substances of different specific gravities, and a third outlet for a substance separated from said substances by said diaphragm.

6. A centrifugal machine having a revoluble bowl provided with an inlet, a diaphragm forming a receptacle within said bowl, outlets from said receptacle for substances of different specific gravities, separate receptacles into which said outlets deliver, a third outlet separated by said diaphragm from said receptacle, and a receptacle into which said third outlet delivers.

7. A centrifugal machine having a revoluble bowl provided with a bottom inlet and top outlets, a sleeve in the top of said bowl forming separated ways to said outlets, and a conduit connecting one of said outlets with said inlet.

8. A centrifugal machine having a revoluble bowl provided with an inlet and three top outlets, a sleeve fixed in the top of said bowl forming an interior receptacle communicating with one of said outlets and an exterior receptacle communicating with two of said outlets, and a conduit connecting one of said two outlets with said inlet.

In testimony whereof I have hereunto set my name this 29th day of April, 1916.

P. T. SHARPLES.